United States Patent [19]

Hill

[11] Patent Number: 4,691,427

[45] Date of Patent: Sep. 8, 1987

[54] TAPE FASTENING SYSTEM

[75] Inventor: Delmar J. Hill, Medford, N.J.

[73] Assignee: Vanguard-Hill, Inc., Wilmington, Del.

[21] Appl. No.: 425,241

[22] Filed: Sep. 28, 1982

[51] Int. Cl.[4] .................... B23P 19/00; B25C 11/00

[52] U.S. Cl. .................................. 29/426.5; 227/63; 227/99; 254/28; 411/474

[58] Field of Search ............ 227/19, 99, 120, DIG. 1, 227/82, 88, 63; 254/28; 411/473, 474, 475 476; 29/426.5, 432, 526 R

[56] References Cited

U.S. PATENT DOCUMENTS

| | | | |
|---|---|---|---|
| 506,861 | 10/1893 | Prentice | 227/DIG. 1 |
| 1,199,791 | 10/1916 | Holcomb | 227/63 |
| 1,491,273 | 4/1924 | Perkins | 227/88 |
| 2,138,495 | 11/1938 | Lewis | 227/88 |
| 2,142,782 | 1/1939 | Gillette | 227/DIG. 1 |
| 3,319,864 | 5/1967 | Adams | 227/120 X |
| 3,385,498 | 5/1968 | Downie | 227/120 X |
| 3,771,708 | 11/1973 | DeNicola et al. | 227/120 X |
| 3,960,147 | 6/1976 | Murray | 411/474 X |
| 4,185,762 | 1/1980 | Froehlich | 227/19 X |

FOREIGN PATENT DOCUMENTS

| | | | |
|---|---|---|---|
| 823878 | 11/1959 | United Kingdom | 911/475 |

*Primary Examiner*—Paul A. Bell
*Attorney, Agent, or Firm*—Thomas A. Lennox

[57] ABSTRACT

An apparatus for clip-stapling a cover which encloses a pre-fab building construction section which includes a pneumatic driving casing having interchangeable heads, wherein the shape of the head is flat for permanent fastening or flat only in the center resulting in a temporary fastener clip staple that is shaped flat in the center and raised rectangular sections at each end so that a three-pronged tool can be used to easily remove the staple without any injury to the resin plastic cover or the building structure section beneath said cover and including a hand drawn stripping which is housed in a canister that is fitted into alignment with the magazine chamber holding the staples.

10 Claims, 4 Drawing Figures

TAPE FASTENING SYSTEM

This application is a substitute for application Ser. No. 206,187 filed on Nov. 12, 1980 now abandoned; to remove the formal objections of the Examiner.

This invention is a taping system designed to secure protective sheet material, temporarily or permanently over prefabricated units of building construction.

Many facets of construction work, whether in conventional field construction or factory-built construction require sheltering enclosures at one time or another. These enclosures are usually polyethylene film used to transmit-wrap factory built structures to protect them in transit or storage. Huge cocoons of plastic film are also used to protect housing, commercial and industrial building wall sections from cold or hot weather while masons, glaziers and other craftsmen complete the permanent building enclosure. These protective films need a quick fastening system that can be rapidly applied with temporary fastening means.

This novel fastening means of this invention can be used in prefabricated construction jobs for residential use to secure a resin plastic covering or an asphalt impregnated paper which is called "building felt" to prevent wind tear. It sometimes takes several days or weeks before the roofing or siding is applied.

To provide temporary enclosures when the construction is wrapped in resin plastic film, it is conventional to use wood strips which are nailed to the wood construction in a permanent manner thrugh the temporary resin plastic film. These wood strips, however, are expensive, awkward to use, time consuming, dangerous and hard to remove on multi-story buildings. They are not uniform because of the presence of knots. They also vary in thickness and have many imperfections.

The novel fastening system of this invention provides a temporary or permanent fastener means that is uniform in size and quality, easily stored and handled as well as being easily removed if desired.

It is therefore an object of this invention to provide a taping system which attaches a stripping tape and pneumatically attachs said tape with a staple clip so shaped as to fasten the tape through the resin plastic sheet covering the construction to be protected, yet permitting said staple clip to be removed without injury to said plastic or the underlying structure being protected.

A further object of this invention is to provide a mass-produced stripping material that is of standard size and dependable composition and strength.

A further object of this invention is to provide a stripping material and fastening clip means that can be easily carried to a worksite by a construction worker.

A further object is to reduce the cost of stripping for protection of the resin plastic covered construction of a prefabricated wall, roof, and floor unit.

With the foregoing objects in view together with such other objects and advantages as may subsequently appear, the invention resides in the parts and in the combination, construction and arrangement of parts hereinafter described and claimed and illustrated by way of example in the accompanying drawing in which:

Figure 1:
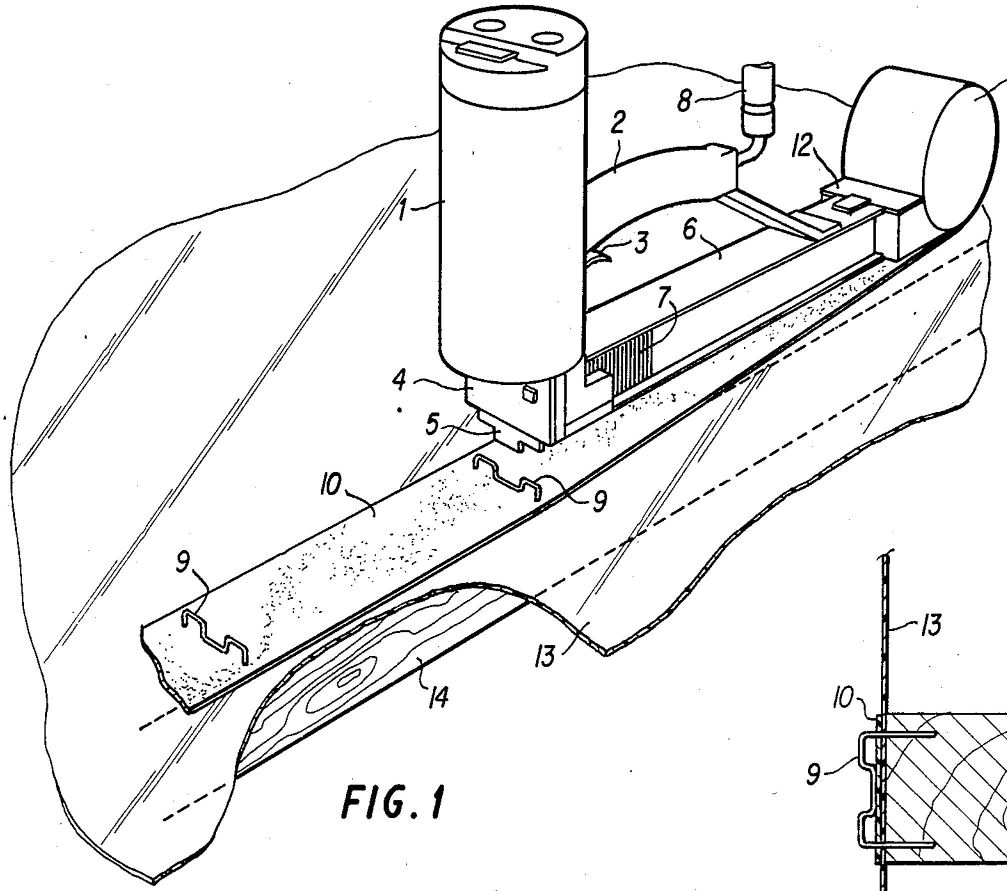
FIG. 1 is a perspective elevated view of the taping system of this invention which includes a stapling gun and tape dispenser.

Referring more specifically to the drawings, FIG. 1 shows the taping system of this invention in which 1 is a pneumatic taping gun cylinder having gun handle 2 and gun trigger 3, a driving head 4 to which there is attached a shaped, fastener driver 5 which is so shaped as to correspond with the staple shape which had a depressed middle section and 2 raised end sections, and a magazine chamber 6, for housing staple clips 7, compressed air supply line 8, tape adapter 12 for connecting the tape canister 11, to the magazine chamber, protective film 13 and structural member 14.

Figure 2:
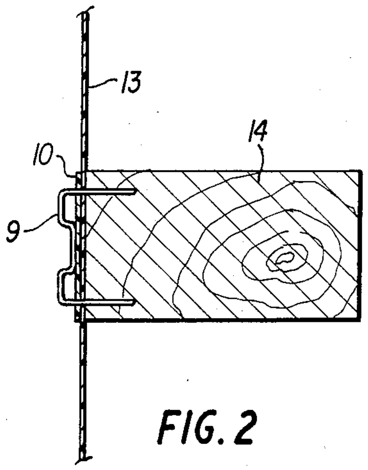
FIG. 2 is a cross sectional view of the manner in which the temporary clip holds the strip, the resin plastic cover and the object being covered.
Figure 4:
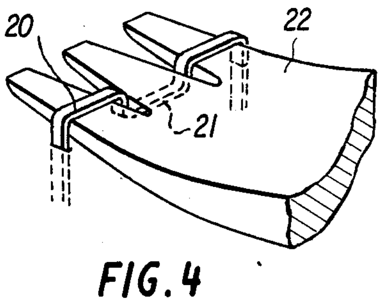
FIG. 4 is a perspective elevational view of how the staple is removed.

A clearer view is provided in FIG. 2 showing the shaped staple clip fastened to the structure 14 through strip 10 and plastic cover 13. Note that the staple clip 9 is fastened with a central depressed section while the two ends are raised in the shape of a rectangle. This permits easy removal by the mere insertion through these raised portions of a 3-pronged tool 22 as shown in FIG. 4. Though the central portion 20 of the staple holds firmly, it still can be easily removed without injury to the wood of the structure or to the resin plastic cover.

The particular shaped staple used in this system is clearly illustrated in FIG. 4. The two rectangular sections 20 of the staple have a central flat section so that if the staple is to be removed, a 3-pronged tool can be inserted. By placing equal pressure on both sides of the staple with the tool, the staple can be removed without any injury to the resin plastic cover or to the underlying wood structure. This is of extreme advantage, since not only is the wood structure unharmed but also the cover being removed can be reused for a different structure. There is no staple system now is use that can accomplish these results.

In actual use, when the protective resin plastic cover is in place over the structural member 14, the stripping tape 10 is hand pulled from the tape cassette past the staple driver 5 and held in position over and parallel to the supporting member 14. The staple gun driver casing 4 is positioned over the stripping tape 10 and the gun trigger is pulled, actuating the staple driver 5 to drive into the wood member one temporary fastener 9 from the end of the staple clip 7 and forcing the fastener 9 legs through the tape 10 and resin plastic cover film 13 into the construction member 14 until the center fastening section of the temporary fastener 9 is tightly forced against tape 10, thus securing both the tape 10 and the film 13. At regular intervals along the stripping tape 10, additional temporary fasteners 9 are gun driven into the supporting member 14. When the procedure is followed on all the construction members which are resin plastic covered, then effective temporary fastening has been achieved.

Figure 3:
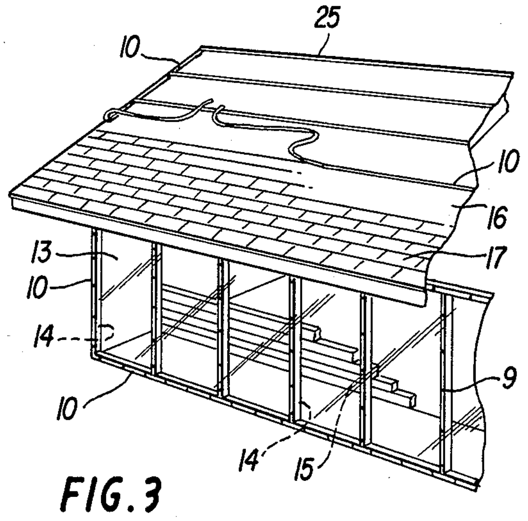
FIG. 3 is a perspective view of a building under construction showing how the strip and resin plastic cover is attached to the roof section of a building construction.

In FIG. 3, there is shown a partial structure of a prefabricated building wherein the roof has covering 6 and is supported by side wall 13, uprights 14 with lengths of timber to be used in construction. The cover 16 is left on the roof during construction, but when finished, this cover is removed. The novel staple used in this system can easily be removed without injury to either the protective cover or to the roof structure.

The stripping tape may be composed of reinforced woven nylon or other fibrous material of sufficient tensile strength. A protectively wrapped highway delivered modular apartment section or high-rise structure section may be subjected to 60 mph winds and would therefore require heavier gauge tape while a protectively enclosed structure section for a one-story dwelling would require a lighter gauge stripping. When shipping export housing that sometimes requires crating, a light gauge metal stripping might have to be used.

The novel staples of this invention, because of their shape, not only firmly hold the stripping to the resin plastic cover and the construction but also allows their easy removal with a three-pronged tool.

This use of this staple saves the cover from injury and such cover may then be folded up and reused instead of being torn to pieces when removing the nailed wooden slats.

Where the stripping tape is used to secure a permanent protective sheet such as roofing felt, then the stripping tape is attached with flush mounted staples since the driving casing head can be replaced with a flat one. The wood holding strips cannot be left behind, they must be removed. It takes time to do this. Using a flush mounted staple with this system enables said staple to be left in place. Thus, use of this system increases the productivity among construction workers and a reduced cost.

Changes or modifications of the above described illustrative embodiment of my invention may be now suggested to those skilled in the art without departing from my inventive concept.

What is claimed is:

1. A method for fastening and detaching a protective cover sheet comprising:

(a) applying the cover sheet over goods to be protected, (b) collecting a supply of preformed staples having a crown with a rectangular shaped depressed center section and corresponding raised end sections at each side of the crown, (c) driving the staples through the cover sheet into goods to be protected with the center section forced against the cover sheet leaving the raised end sections extending upwardly from the cover sheet, (d) inserting a three pronged tool under the driven staples, the tool comprising:

(i) a center prong of sufficient size and shape to be inserted over and abut the depressed center section of the staple, and (ii) two side prongs of sufficient size and shape to be inserted under the two upraised end sections of the staple, and (e) lifting on the tool to apply upward pressure from the two side prongs to the end sections to remove the staple.

2. The method of claim 1 further comprising:

(a) charging the staples to a magazine to hold the staples, (b) feeding the staples from the magazine to a pneumatic staple gum comprising a shaped driving head, and (c) training and aligning continuous stripping tape between the shaped driving head and the protective cover.

3. A fastening system for attaching and detaching a resin plastic cover sheet to protect a prefabricated panel construction in transit comprising:

(a) a preformed staple having a crown with a rectangular shaped depressed center section and corresponding raised rectangular shaped end sections at each side of the crown, (b) a pneumatic gun comprising:

(i) a magazine containing a supply of said staples, and (ii) a shaped driving head which conforms to said preformed staple so that when said staple is driven into a panel, said center section can firmly attach the cover sheet, and (c) a three pronged tool comprising:

(i) a center prong of sufficient size and shape to be inserted over and abut center section of the staple, (ii) two side prongs of sufficient size and shape to be inserted under the two upraised end sections of the staple, and (iii) lifting means to apply upward pressure from the two side prongs to the end sections to remove said staple from the cover sheet.

4. The fastening system as set forth in claim 3 which further comprises continuous stripping tape and a tape storage means comprising a chamber fixed to said pneumatic gun to store, align and train the continuous stripping tape under the shaped driving head.

5. The fastening system of claim 4 wherein the tape is plastic resin.

6. The fastening system of claim 4 wherein the tape is thin metal.

7. A fastening system for attaching and detaching a resin plastic cover sheet to protect a prefabricated panel construction in transit comprising:

(a) a preformed staple having a crown with a rectangular shaped depressed center section and corresponding raised end sections at each side of the crown, (b) driving means to drive the staple through the cover and into the panel with the center section forced against the cover sheet leaving the raised end sections extending upwardly from the cover sheet, and (c) a three pronged tool comprising:

(i) a center prong of sufficient size and shape to prevent the center section of the staple from deforming as it is extracted allowing one leg of the staple to be withdrawn and leaving the other leg embedded, (ii) two side prongs of sufficient size and shape to be inserted under the two upraised end sections of the staple, and (iii) lifting means to apply upward pressure from the two side prongs to the end sections to remove said staple from the cover sheet.

8. The fastening system of claim 7 wherein the driving means comprises a pneumatic gun comprising:

(i) a magazine containing a supply of the preformed staples, (ii) a shaped driving head which conforms to the shape of the preformed staple, and (iii) a supply of continuous stripping tape, and (iv) a tape storage means comprising a chamber fixed the pneumatic gun to align and train the continuous stripping tape under the shaped driving head.

9. The fastening system of claim 8 wherein the tape is plastic resin.

10. The fastening system of claim 8 wherein the tape is thin metal.

* * * * *